United States Patent Office 2,793,216
Patented May 21, 1957

2,793,216

15-OXY-ANDROSTENES AND 15-OXY-19-NORANDROSTENES

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application August 17, 1954,
Serial No. 450,528

8 Claims. (Cl. 260—397.4)

This invention relates to steroids and more particularly to certain testosterone derivatives namely 15-hydroxytestosterone, 15-hydroxy-10-normethyltestosterone and their esters represented by the following formula:

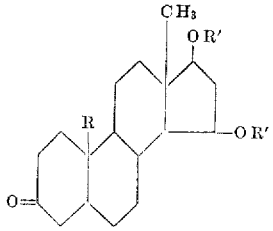

wherein R is hydrogen or methyl and R' is hydrogen or acyl.

It is an object of this invention to provide the novel 15-hydroxytestosterone, 15 - hydroxy-10-normethyltestosterone and their esters and a process of preparing the same. Other objects will be apparent to those skilled in the art to which this invention pertains.

The novel compounds of the present invention may be prepared from testosterone or 10-normethyltestosterone by the oxygenating action of a culture of the fungus *Penicillium urticae* as described in the Murray and Peterson Patent 2,649,400 issued August 18, 1953.

The esters may be produced by admixing 15-hydroxytestosterone or 15-hydroxy-10-normethyltestosterone with an acylating agent such as, for example, ketene, a ketene of a selected acid, an acid, acid chloride or acid anhydride, or other known acylating agent usually in a solvent such as, for example, pyridine or the like, or an inert solvent, including solvents like benzene, toluene, ether, and the like, for example, and heated at a temperature between about zero degrees centigrade and the boiling point of the reaction mixture usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The thus-described acylation process, and as illustrated in more detail in the examples following in this specification, produces both the mono-esters and the di-esters, although in different proportions, depending upon the proportions of acylating agent to steroid. Using approximately one equivalent of acylating agent to steroid produces predominantly the monoacylated product, whereas with about two or more equivalents of acylating agent to steroid, the predominant product is the diacylated product.

The following examples are illustrative of the present invention but are not to be construed as limiting.

Example 1.—15-hydroxytestosterone

A medium was prepared having a composition of fifty grams of Cerelose dextrose, three grams of tartaric acid, three grams of ammonium nitrate, 0.4 gram of dibasic ammonium phosphate, 0.4 gram of potassium carbonate, 0.3 gram of magnesium carbonate, 0.3 gram of diammonium sulfate, 0.2 gram of zinc sulfate, 0.05 gram of ferrous sulfate, and one gram of sodium acetate diluted to one liter with industrial tap water. Twelve liters of this heat sterilized medium was inoculated with spores of *Pencillium urticae*. Into this, there was dispersed a solution of three grams of testosterone in 100 milliliters of acetone. Fermentation proceeded at room temperature for 56 hours with agitation and aeration at a rate of one liter per minute. The whole beer containing mycelium was extracted four times, each time with three liters of methylene chloride. The combined methylene chloride extract was washed twice, each time with one-tenth by volume portions of a two percent aqueous solution of sodium bicarbonate and then twice with one-tenth by volume portions of water. The methylene chloride extract was dried with anhydrous sodium sulfate and then freed of solvent on a steam bath. The residue was dissolved in 100 milliliters of benzene and chromatographed over 150 grams of alumina (hydrochloric acid washed, water washed, and dried at 120 degrees centigrade for four hours) using 140-milliliter portions of developing solvent as indicated in the chromatogram table.

Fractions 23, 24 and 25 were combined and recrystallized twice from acetone to yield 15-hydroxytestosterone, also named 15,17β-dihydroxy-4-androsten-3-one, having a melting point of 199–201 degrees centigrade, an optical rotation $[\alpha]_D$ of plus 155 degrees at a concentration of 0.9 in chloroform; λ maximum in alcohol of 242 millimicrons; E of 16,200. The infrared spectrum confirmed the structure.

*Analysis.*—Calculated for $C_{19}H_{28}O_3$: C, 74.96; H, 9.27. Found: C, 74.78; H, 9.43.

CHROMATOGRAM TABLE

| Fraction | Solvent | Eluate Solids, Milligrams |
| --- | --- | --- |
| 1 | benzene | 138 |
| 2 | do | 90 |
| 3 | benzene-ether 1:1 | 124 |
| 4 | do | 28 |
| 5 | ether | 13 |
| 6 | do | 10 |
| 7 | ether-chloroform 10:1 | 10 |
| 8 | do | 12 |
| 9 | ether-chloroform 5:1 | 38 |
| 10 | do | 116 |
| 11 | ether-chloroform 1:1 | 215 |
| 12 | do | 90 |
| 13 | chloroform | 545 |
| 14 | do | 213 |
| 15 | chloroform-acetone 20:1 | 159 |
| 16 | do | 128 |
| 17 | chloroform-acetone 10:1 | 266 |
| 18 | do | 178 |
| 19 | chloroform-acetone 5:1 | 107 |
| 20 | do | 96 |
| 21 | chloroform-acetone 1:1 | 278 |
| 22 | do | 233 |
| 23 | acetone | 520 |
| 24 | do | 412 |
| 25 | acetone-methanol 20:1 | 164 |
| 26 | acetone-methanol 10:1 | 228 |
| 27 | methanol | 136 |

Example 2.—15-hydroxy-10-normethyltestosterone

Otherwise like Example 1, using 10-normethyltestosterone as the starting steroid produced 15-hydroxy-10-normethyltestosterone.

Example 3.—15-acetoxy-testosterone acetate

A mixture of 100 milligrams of 15-hydroxytestosterone (15,17β-dihydroxy-4-androsten-3-one), two milliliters of acetic anhydride and two milliliters of pyridine was maintained at room temperature for 24 hours. It was then quenched with 100 milliliters of ice water and filtered. The crystalline precipitate was recrystallized twice from acetone-ether to give 65 milligrams of 15-acetoxy-testosterone acetate (15,17β-diacetoxy-4-androsten-3-one) having a melting point of 212 to 215 degrees centigrade, an optical rotation [α]$_D$ of plus 133 degrees at a concentration of 0.9 in chloroform; a λ maximum in alcohol of 241 millimicrons and an E of 16,100. The infrared spectrum showed complete acetylation.

*Analysis.*—Calculated for C$_{23}$H$_{32}$O$_5$: C, 71.10; H, 8.30. Found: C, 70.98; H, 8.36.

Example 4.—15-formyloxytestosterone formate

In the same manner as Example 3, using an excess of formic acid in place of acetic anhydride produced 15-formyloxytestosterone formate.

Example 5.—15-(β-cyclopentyl)propionyloxytestosterone β-cyclopentylpropionate In the same manner as Example 3, using β-cyclopentylpropionyl chloride in place of acetic anhydride produced 15 - (β - cyclopentyl)propionyloxytestosterone β-cyclopentylpropionate.

Example 6.—15-propionyloxytestosterone propionate

In the same manner as Example 3, using propionic anhydride in place of acetic anhydride produced the 15-propionyloxytestosterone propionate.

Example 7.—15-benzoxytestosterone benzoate

In the same manner as Example 3, using benzoyl chloride in place of acetic anhydride produced the 15-benzoxytestosterone benzoate.

Example 8.—15-trimethylacetoxytestosterone trimethylacetate

In the same manner as Example 3, using trimethylacetyl chloride in place of acetic anhydride produced 15-trimethylacetoxytestosterone trimethylacetate.

Example 9.—15-acetoxy-10-normethyltestosterone acetate

Otherwise like Example 3 using 15-hydroxy-10-normethyltestosterone as starting material produced 15-acetoxy-10-normethyltestosterone acetate.

Example 10.—15-acyloxy-10-normethyltestosterone acylate

In the same manner as Examples 4 through 8, starting with 15-hydroxy-10-normethyltestosterone produced the corresponding 15-formyloxy - 10 - normethyltestosterone formate, 15 - (β-cyclopentyl)propionyloxy-10-normethyltestosterone β-cyclopentylpropionate, 15-propionyloxy-10-normethyltestosterone propionate, 15-benzoxy-10-normethyltestosterone benzoate, and 15-trimethylacetoxy-10-normethyltestosterone trimethylacetate.

In a similar manner, other esters of 15-hydroxytestosterone and 15-hydroxy-10-normethyltestosterone are prepared according to acylation procedures as illustrated above or by reaction with ketene, ketenes of selected acids, selected acids, acid anhydrides or acid chlorides in an organic solvent such as pyridine or the like. Representative esters of 15-hydroxytestosterone and 15-hydroxy-10-normethyltestosterone thus prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids having less than nine carbon atoms and which form ester groups, such as, for example, formyl-oxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, α and β-cyclopentylpropionyloxy, acrylyloxy, cyclohexylformyloxy, the half and di-esters of polybasic acids such as malonic, maleic, succinic, glutaric and adipic acids, and the like. The acids may also contain non-interfering substituents, such as mono or poly halo, chloro, bromo, hydroxy, methoxy, and the like if desired.

The 15-hydroxytestosterone, 15-hydroxy-10-normethyltestosterone and their esters are useful as chemical intermediates and have pharmacological activity per se. They have anabolic, antihypertensive, anti-bacterial and anti-fungal activity. They are additionally useful as emulsifying agents and to increase the solubility of known physiologically active steroids.

It is to be understood that this invention is not to be limited to the exact details of operation or exact compounds shown and described as obvious modificaions and equivalents will be apparent to one skilled in the art and the invention is therefore to be limited only by the scope of the appended claims.

We claim:

1. A compound represented by the graphical formula:

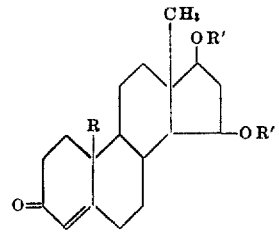

wherein R is selected from the radicals consisting of hydrogen and methyl, and R' is selected from the radicals consisting of hydrogen and hydrocarbon-carboxylic acyl radical containing less than nine carbon atoms.

2. 15-hydroxytestosterone.
3. 15-hydroxy-10-normethyltestosterone.
4. 15-acyloxytestosterone acylate represented by the graphical formula:

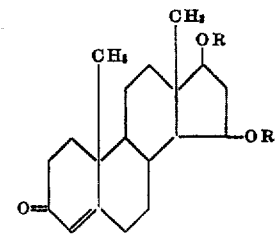

wherein R is a hydrocarbon radical containing less than nine carbon atoms.

5. 15-acyloxy-10-normethyltestosterone acylate represented by the graphical formula:

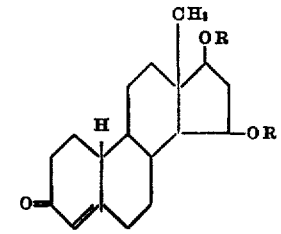

wherein R is a hydrocarbon radical containing less than nine carbon atoms.

6. 15-propionyloxytestosterone propionate.
7. 15-(β-cyclopentyl)propionyloxytestosterone β-cyclopentylpropionate.
8. 15-trimethylacetoxytestosterone trimethylacetate.

References Cited in the file of this patent

UNITED STATES PATENTS

| 2,458,495 | Foster | Jan. 11, 1949 |
| 2,602,769 | Murray et al. | July 8, 1952 |

OTHER REFERENCES

Stedola: Jour. Org. Chem. 6, 841–844 (1941).

UNITED STATES PATENT OFFICE

CERTIFICATE OF CORRECTION

Patent No. 2,793,216

May 21, 1957

Herbert C. Murray et al.

It is hereby certified that error appears in the printed specification of the above numbered patent requiring correction and that the said Letters Patent should read as corrected below.

Column 4, line 60 and column 5, line 1, after "hydrocarbon", each occurrence, insert -- -carboxylic acyl --.

Signed and sealed this 6th day of August 1957.

(SEAL)
Attest:
KARL H. AXLINE
Attesting Officer

ROBERT C. WATSON
Commissioner of Patents